March 10, 1970   D. A. LANDAU   3,499,341
SPRING RETAINER FOR EXPANSIBLE V-PULLEY
Filed Sept. 18, 1968
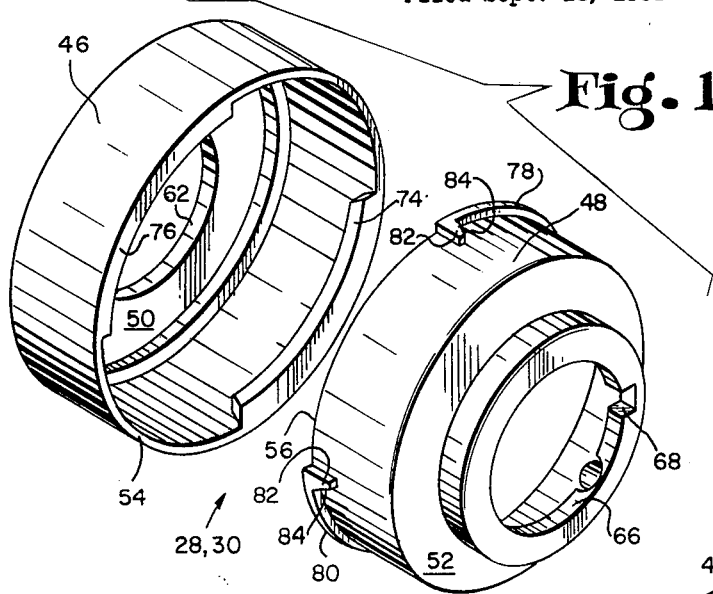
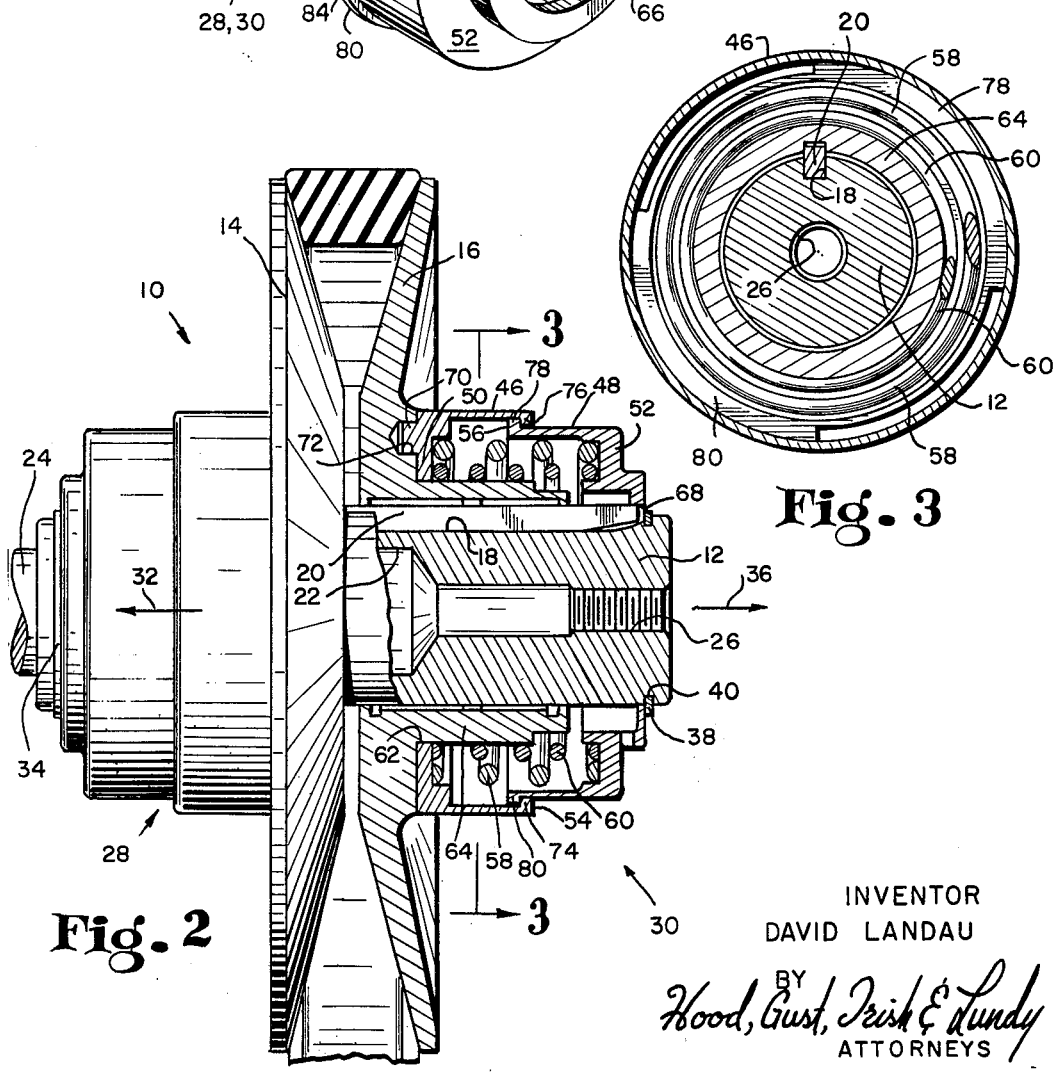
INVENTOR
DAVID LANDAU
BY
Hood, Gust, Irish & Lundy
ATTORNEYS

United States Patent Office 3,499,341
Patented Mar. 10, 1970

3,499,341
SPRING RETAINER FOR EXPANSIBLE V-PULLEY
David A. Landau, Muncie, Ind., assignor to The Reliance Electric and Engineering Company, Cleveland, Ohio, a corporation of Ohio
Filed Sept. 18, 1968, Ser. No. 760,507
Int. Cl. F16h 55/56; F16f 1/06, 1/12
U.S. Cl. 74—230.17                                    12 Claims

ABSTRACT OF THE DISCLOSURE

A spring retainer cartridge comprising a pair of tubular members, each member having a partially closed end and an open end, the members being telescopically and coaxially disposed with the partially closed ends defining the opposing end walls of the cartridge. A coiled spring is compressed between the opposing end walls. Each tubular member is provided with peripherally and radially extending lip means adjacent its open end, the lip means being proportioned and arranged so that, when one member is rocked about its axis to one position relative to the other member, the lip means are cooperatively engaged to prevent axial separation of the members, thereby to hold the spring in compression, and when the one member is rocked about its axis to a second position relative to the other member, the lip means are disengaged to permit axial separation of the members by the spring. Preferably, the lip means are so designed that, in said one relative position, relative rocking movement of said members is inhibited. This spring cartridge or retainer is ideally suited for use with a resiliently-expansible V-pulley.

---

The present invention relates to a spring cartridge intended for use primarily in a resiliently-expansible V-pulley structure. Such a structure conventionally comprises a pair of mating coned discs, one of said discs being axially movable on a spindle or hub toward and away from the other disc. A coiled spring is used yieldingly to urge the discs together. In some cases, as will be discussed hereinafter, it is also conventional to provide an expansible V-pulley comprising a pair of mating coned discs, both of which are mounted for axial movement on a hub, and coiled springs arranged, respectively, to urge the coned discs together.

Such coiled springs are subject to fatigue and breakage necessitating their replacement from time to time. While the initial assembly of such a structure by the manufacturer presents only expectable manufacturing problems, the replacement of the spring by a user is relatively difficult and, in fact, quite hazardous.

It is a primary object of this invention, therefore, to provide a cartridge for such a spring, which cartridge can be completely assembled and "pre-compressed" prior to its incorporation in such a V-pulley structure. The spring cartridge, after it is completely assembled and "pre-compressed," can be easily assembled to and disassembled from the V-pulley structure.

Another object of the present invention is to provide a novel construction for such a cartridge which will receive and hold the spring safely under compression and in proper alignment for future assembly in a V-pulley structure.

Spring cartridges of this type are known. See, for instance, Lang Patent 2,842,355 and Reeves et al. Patent 2,287,326. The cartridge of the present invention is an improvement over such prior art spring cartridges primarily in that it comprises a two-part housing which is simple in construction, but yet effective for the purpose intended.

Specifically, the cartridge of the present invention comprises two tubular members, each of which is formed with peripherally and radially extending lip segments which cooperatively engage the lip segments on the other member to prevent axial separation of the members, thereby to hold the spring contained therein in compression. As a safety feature, each lip segment on one of the members is preferably provided with axially extending lug portions which receive therebetween one of the lip segments of the other member to prevent relative rotation of the members without further compression of the spring contained therein.

To the accomplishment of the above and related objects, the present invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is an exploded perspective view of the cartridge housing;

FIG. 2 is an elevational view, partially sectioned, showing a dual acting, expansible V-pulley utilizing the spring cartridges of the present invention; and FIG. 3 is a sectional view taken from FIG. 2 generally along the line 3—3.

Referring now to the drawings, and particularly to FIG. 2, it will be seen that there is illustrated a dual acting expansible V-pulley 10 comprising a hub shaft 12 on which a pair of mating coned discs 14, 16 are mounted for axial movement. The hub shaft 12 is formed with an axially extending keyway 18 in which a key 20 is disposed, this key serving to prevent rotation of the discs 14, 16 relative to the hub shaft 12.

The hub shaft 12 is further formed with an internal, coaxial bore 22 into which a motor shaft may extend, a portion of a motor shaft 24 being illustrated. A key (not shown) is conventionally arranged to provide a driving connection between the shaft 24 and the hub shaft 12. A portion of the bore 22 is threaded as indicated at 26. Thus, if it becomes necessary to remove the hub shaft 12 from the motor shaft 24, a jack screw can be threadedly engaged in the bore portion 26 and turned until it engages the end of the motor shaft to shift the parts.

A spring cartridge 28, 30 is arranged yieldingly to urge each coned disc 14, 16 toward its mating disc, the cartridge 30 being shown in section in FIG. 2. The cartridge 28 is restrained against movement in the direction of the arrow 32 on the hub shaft 12 by means of a conventional snap ring 34 and the cartridge 30 is restrained against movement in the direction of the arrow 36 by means of a conventional snap ring 38. These snap rings 34, 38, which are conventional stop means, are respectively received in peripheral grooves, such as the illustrated groove 40, in the hub shaft 12. It will be appreciated that the V-pulley 10 can be disassembled by removing the snap rings 34, 38 and then removing the cartridges 28, 30 and coned discs 14, 16 from the hub shaft 12. Alternatively, the hub shaft 12 can be left on the motor shaft 24 and the V-pulley 10 can be disassembled by removing the snap ring 38 and then sliding the cartridges 28, 30 and coned discs 14, 16 from the right-hand end (FIG. 2) of the hub shaft 12.

Each cartridge 28, 30 comprises a pair of tubular members 46, 48, each of which is formed with a partially closed end 50, 52 and an open end 54, 56. It will be appreciated that the partially closed ends 50, 52, respectively, of the members 46, 48 provide opposing end walls between which springs 58, 60 are compressed.

The end wall 50 is provided with a centrally located bore 62 which receives the hub shaft 12. Specifically, in the illustrative embodiment of FIG. 2, a hub portion 64 of each disc 14, 16 extends into the bore 62 of its associated member 46.

The members 46, 48 are, of course, telescopically disposed with the open end 56 of the member 48 being inserted into the open end 54 of the member 46. Also, the axes of the members 46, 48 coincide generally with the axis of the hub shaft 12.

The end wall 52 is provided with a centrally located bore 66 which receives the hub shaft 12. This bore 66 is also formed with a keyway 68 which engages the key 20 to prevent rotation of the member 48 relative to the hub shaft 12. The member 46 is provided with an axially extending lug 70 which engages an opening 72 formed in the disc 16 to prevent rotation of the member 46 relative to the disc 16. Since the cartridges 28, 30, i.e., the tubular members 46, 48 of each cartridge, cannot rotate relative to the hub shaft 12, and since the discs 14 and 16 also cannot rotate relative to the hub shaft 12, the entire pulley assembly 10 can be balanced as an assembly and will remain in a balanced condition. The advantage of this feature will be appreciated. Additionally, as will be more fully explained hereinafter, the engagement of the lug 70 in the opening 72 and the engagement of the key 20 with the keyway 68 will prevent axial separation of the members 46, 48 while they are mounted on the hub shaft 12. That is, since axial separation of telescoped members 46, 48 requires relative rotation thereof, axial separation cannot occur as long as the key 20 is engaged in the keyway 68 and the lug 70 is engaged in the opening 72.

Each member 46 is formed with radially inwardly and peripherally extending lip segments 74, 76 adjacent its open end 54, the lip segments being diametrically oppositely disposed and each lip segment extending slightly less than 90° about the periphery of the member. Each member 48 is formed with radially outwardly and peripherally extending lip segments 78, 80, the segments 78, 80 being diametrically oppositely disposed and each segment extending slightly more than 90° about the periphery of the member. In the illustrative embodiment, each segment 74, 76 extends approximately 82° about the periphery of the member 46 and each segment 78, 80 extends approximately 96° about the periphery of the member 48. The segments 78, 80 must be slightly longer than the segments 74, 76 because each segment 78, 80 is provided, at each of its ends, with a lug portion 82 which extends axially toward the end wall 52, only one lug portion 82 of each segment 78, 80 being seen in FIG. 1 of the drawings. Each lug portion 82 is provided with a side 84 which is inclined at an obtuse angle relative to the segment 78, 80 from which it extends.

When the member 48 is inserted into the member 46, the segments 78, 80 move axially through the spaces, respectively, between the segments 74, 76. After the member 48 is so inserted into the member 46, and the member 48 is rotated approximately 90° about its axis, each segment 78, 80 will engage one segment 74, 76 to prevent axial separation of the members 46, 48 by the springs 58, 60 compressed between the end walls 50, 52.

The lip segments 74, 76, 78, 80 are arranged so that, when the member 48 is rocked to one position about its axis relative to the member 46, the lip segments are cooperatively engaged to prevent axial separation of the members and, when the member 48 is rocked to a second position which is, in the illustrative embodiment, approximately 90° from the locking position, the members 46 and 48 can be axially separated.

The lugs 82 at opposite ends of each segment 78, 80 form a socket which receives, respectively, the lip segments 74, 76. Thus, when the lip segments 74, 76 are engaged in such sockets, the members 46, 48 cannot be relatively rocked far enough to be axially separated without further compression of the springs 58, 60. The lugs 82, therefore, provide a safety feature.

Each spring cartridge 28, 30 is assembled by placing the springs 58, 60 between the members 46, 48 and then, with a hydraulic ram or the like, inserting the member 48 into the member 46 and rotating the member 48 about its axis to achieve a locking relationship between the lip segments 74, 78 and the lip segments 76, 80 as discussed previously. After such a locking relationship is achieved, the springs 58, 60 will urge the members 46, 48 in the opposite directions and, in use, will yieldably resist axial collapse of the cartridge.

What is claimed is:

1. A spring cartridge comprising a pair of tubular members, each member having a partially closed end and an open end, said members being telescopically and coaxially disposed with the partially closed ends defining the opposing end walls of said cartridge, one of said members providing peripherally and radially extending first lip means adjacent its open end and the other of said members providing peripherally and radially extending second lip means adjacent its open end, and a coiled spring compressed between the opposing end walls, the axis of said spring coinciding generally with the axes of said members, said lip means being proportioned and designed so that, when said one member is rocked about its axis to one position relative to said other member, said lip means are cooperatively engaged to prevent axial separation of said members, thereby to hold said spring in compression, and when said one member is rocked about its axis to a second position relative to said other member, said lip means are disengaged to permit axial separation of said members by said spring.

2. The spring cartridge of claim 1 in which said first lip means includes a pair of diametrically oppositely disposed first lip segments and said second lip means includes a pair of diametrically oppositely disposed second lip segments.

3. The spring cartridge of claim 2 in which each of said first lip segments extends slightly less than 90° about the periphery of said cartridge and each of said second lip segments extends slightly more than 90° about the periphery of said cartridge, whereby the angle between said one position and said second position is approximately 90°.

4. The spring cartridge of claim 2 in which each of said second lip segments is provided, at each of its ends, with a lug extending axially toward the partially closed end of said other member, said lug portions of each second lip segment providing a socket receiving one of said first lip segments when said one member is in its said one position, said lug portions being effective to prevent rocking of said one member from said one position without further compression of said spring.

5. The spring cartridge of claim 4 in which said second lip segments extend radially outwardly and said first lip segments extend radially inwardly.

6. The spring cartridge of claim 4 in which each of said first lip segments extends slightly less than 90° about the periphery of said cartridge and each of said second lip segments extends slightly more than 90° about the periphery of said cartridge, whereby the angle between said one position and said second position is approximately 90°.

7. The spring cartridge of claim 1 in which said first lip means includes a first lip segment, and in which said second lip means includes a second lip segment having, at each of its ends, a lug portion extending axially toward the partially closed end of said other member whereby, when said one member is in its said one position, said first lip segment is receivably engaged between said lug portions, said lug portions being effective to prevent rocking of said one member from said one position without further compression of said spring.

8. The spring cartridge of claim 7 in which the side of each lug portion which engages an end of said first lip segment is inclined at an obtuse angle relative to said second lip segment.

9. In combination, a resiliently-expansible V-pulley including a hub, a coned disc axially movable on said hub and key means operatively engaging said disc and said hub to prevent rotation of said disc relative to said hub, and a spring cartridge comprising a pair of tubular members, each member having an end formed with a bore which receives said hub and an open end, said members being telescopically associated and coaxially disposed on said hub, the bored ends of said members defining the opposing end walls of said cartridge, one of said members providing peripherally and radially extending first lip means adjacent its open end and the other of said members providing peripherally and radially extending second lip means adjacent its open end, and a coiled spring compressed between the end walls of said cartridge, the axis of said spring coinciding generally with the axis of said hub, said lip means being proportioned and designed so that, when said one member is rocked about its axis to one position relative to said other member, said lip means are cooperatively engaged to prevent axial separation of said members, thereby to hold said spring in compression, and, when said one member is rocked about its axis to a second position relative to said other member, said lip means are disengaged to permit axial separation of said members, first stop means for preventing relative rotation between said cartridge and said disc, and second stop means for preventing axial movement of said cartridge away from said disc.

10. The combination of claim 9 in which said other member is provided with an axially extending keyway for engaging said key and preventing relative rotation between said other member and said hub and in which said first stop means includes a lug provided on said one member, said disc being provided with an opening for engaging said lug to prevent relative rotation between said disc and said one member.

11. The combination of claim 9 in which said first lip means includes a pair of diametrically oppositely disposed first lip segments and said second lip means includes a pair of diametrically oppositely disposed second lip segments, each of said first segments extending slightly less than 90° about the periphery of said cartridge and each of said second lip segments extending slightly more than 90° about the periphery of said cartridge, whereby the angle between said one position and said second position is approximately 90°.

12. The combination of claim 11 in which each of said second lip segments is provided, at each of its ends, with a lug portion extending axially toward the bored end of said other member, said lug portions of each second lip segment providing a socket for receivably engaging one of said first lip segments when said one member is in its said one position, said lug portions being effective to prevent rocking of said one member from said one position without further compression of said spring.

References Cited
UNITED STATES PATENTS

| | | | |
|---|---|---|---|
| 2,287,326 | 6/1942 | Reeves et al. | 74—230.17 |
| 2,842,355 | 7/1958 | Lang | 74—230.17 XR |
| 3,318,166 | 5/1967 | Anderson et al. | 74—230.17 |

FOREIGN PATENTS

| | | |
|---|---|---|
| 580,094 | 8/1946 | Great Britain. |
| 1,074,658 | 4/1954 | France. |

JAMES A. WONG, Primary Examiner

U.S. Cl. X.R.

267—1